(12) United States Patent
Schürmann

(10) Patent No.: US 6,969,247 B2
(45) Date of Patent: Nov. 29, 2005

(54) INJECTION MOLDING UNIT WITH A DEVICE FOR MIXING AND METERING PLASTIC MELT AND ADDITIVES

(75) Inventor: Erich Schürmann, Sendenhorst (DE)

(73) Assignee: Demag Ergotech GmbH, Schwaig (DE)

( * ) Notice: Subject to any disclaimer, the term of this patent is extended or adjusted under 35 U.S.C. 154(b) by 0 days.

(21) Appl. No.: 10/766,286

(22) Filed: Jan. 28, 2004

(65) Prior Publication Data

US 2004/0228945 A1 Nov. 18, 2004

Related U.S. Application Data

(63) Continuation of application No. PCT/DE02/02623, filed on Jul. 18, 2002.

(30) Foreign Application Priority Data

Jul. 28, 2001 (DE) ................................. 101 37 073

(51) Int. Cl.[7] .......................................... B29C 45/48
(52) U.S. Cl. ..................... 425/558; 425/200; 425/559; 425/561
(58) Field of Search ............................ 425/557, 558, 425/559, 561, 200; 366/20, 50, 78

(56) References Cited

U.S. PATENT DOCUMENTS

| | | | |
|---|---|---|---|
| 4,128,342 A | 12/1978 | Renk | 366/99 |
| 4,749,279 A * | 6/1988 | Csongor | 366/80 |
| 5,641,227 A * | 6/1997 | Geyer | 366/78 |
| 6,305,831 B1 * | 10/2001 | Gathmann et al. | 366/79 |

FOREIGN PATENT DOCUMENTS

| | | |
|---|---|---|
| DE | 19 03 540 A | 8/1970 |
| DE | 201 12 525 U | 11/2001 |
| JP | 09 277298 A | 10/1997 |
| JP | 2000 218664 A | 8/2000 |
| JP | 2000218665 | 8/2000 |

* cited by examiner

*Primary Examiner*—Robert Davis
*Assistant Examiner*—Emmanuel S. Luk
(74) *Attorney, Agent, or Firm*—Henry M. Feiereisen

(57) ABSTRACT

An injection unit for an injection molding machine includes an injection device in the form of a plunger/screw, which is driven axially and rotationally in a housing, and a device intended for mixing and metering plastic melt and including an inlet for introduction of an additive. A spacer element is disposed between a backflow prevention assembly of the screw and the plunger, with the spacer element having a length, which corresponds at least to the stroke of the injection device. The spacer element has a first flow channel for establishing in each position a fluidic connection with a second flow channel which initially extends radially in an outward direction and then parallel to the movement and guide area of the plunger to an area between a nozzle and the plunger. The second flow channel extends through the mixing and metering device arranged adjacent to a movement and guide area of the plunger.

6 Claims, 9 Drawing Sheets

INJECTION MOLDING UNIT WITH A DEVICE FOR MIXING AND METERING PLASTIC MELT AND ADDITIVES

CROSS-REFERENCES TO RELATED APPLICATIONS

This application is a continuation of prior filed copending PCT International application no. PCT/DE02/02623, filed Jul. 18, 2002, which designated the United States and on which priority is claimed under 35 U.S.C. §120, the disclosure of which is hereby incorporated by reference.

This application claims the priority of German Patent Application, Serial No. 101 37 073.3, filed Jul. 28, 2001, pursuant to 35 U.S.C. 119(a)–(d), the disclosure of which is incorporated herein by reference.

BACKGROUND OF THE INVENTION

The present invention relates, in general, to an injection unit of an injection molding machine, and more particularly to an injection device for use in such an injection unit.

An injection unit of a type involved here typically includes an injection device which is configured as plunger/screw and operated in a housing for axial as well as rotating movements and which is provided with a backflow prevention assembly. The injection device is provided for plastication during transport of the plastic granulate and acts as plunger, when the plastic melt is pressed through a nozzle into an injection mold. Additives such a colorants, foaming agents, lubricants, or the like, are normally admixed into the plastic granulate before plastication by the screw is carried out.

It is also known to provide conventional plunger-type screw injection molding units with separate metering and mixing devices for mixing and metering the plastic melt as well as additives. These systems suffer, however, major problems as far as a permanent sealing of the shaft and plunger passageways are concerned because jointed areas that move relative to one another must be sealed to prevent against escape of plastic melt.

It would therefore be desirable and advantageous to provide an improved injection unit of an injection molding machine with an injection device, which obviates prior art shortcomings and which is so configured to include a metering and mixing device, without need for sealing moving parts against the outside to prevent escape of melt, while yet being simple in structure and of compact size.

SUMMARY OF THE INVENTION

According to one aspect of the present invention, an injection unit of an injection molding machine, includes a housing having an inner diameter; an injection device received in the housing for carrying out axial and rotating movements and including a screw constructed for plasticizing plastic granulate during transport thereof into plastic melt and including a backflow prevention assembly, a plunger for pressing the plastic melt from an accumulation chamber through a nozzle into an injection mold, and a spacer element arranged between the backflow prevention assembly of the screw and the plunger and having a length corresponding at least to a stroke of the injection device, with the spacer element having a first flow channel for establishing in each position of the injection device a fluidic communication with a second flow channel which initially extends radially outwards and then parallel to a movement and guide area of the plunger to an area between the nozzle and the plunger, and a mixing and metering device embracing the plunger at least partially in a circular ring shaped manner for mixing and metering plastic melt and including an inlet for introduction of an additive, wherein the second flow channel extends through the mixing and metering device adjacent to the movement and guide area of the plunger, with the mixing and metering device being in driving relationship with the injection device and including a rotatable tube in fixed rotative connection with the plunger, and a plurality of mixing elements arranged on the tube and on the inner diameter of the housing.

An injection device according to the invention has numerous advantages compared to prior art devices. On the one hand, no moving parts have to be sealed from outside against escape of melt, so that the construction is simplified. In addition, the coaxial configuration of the mixing and metering device results in a straight force flux while the structural size is reduced at the same time.

The mixing and metering device can advantageously embrace the plunger at least partially in a circular ring shaped manner, wherein it is basically possible in this context to motionally connect the mixing and metering device in relation to its rotation movement with the injection device. In this way, there is no need for an additional drive for the mixing and metering device so that overall the injection device becomes simpler.

According to another advantageous feature of the present invention, the mixing and metering device includes a first plurality of mixing elements which are arranged on the rotatable tube that is rotationally connected with the plunger, and a second plurality of mixing element which are arranged on the inner diameter of the housing. The mixing and metering device is hereby disposed in immediate proximity of the movement path of the plunger, but separate therefrom, thereby positively affecting the structural size, whereby the flow channel for the melt extends through the mixing and metering device about the movement space of the plunger.

In such a mixing and metering device, the first and second pluralities of mixing elements may have, for example, different surface configurations in opposite relationship, in particular toothed surfaces, to realize a thorough mixing of the melt with the additives that have been added to the mixing and metering device.

According to another advantageous feature of the present invention, the spacer element may be formed by a continuously tapered shaft, whereby the circular ring shaped flow cross section, which surrounds the shaft, is fully available for transport of the melt from the screw to the mixing and metering device. In a most simple manner, the necessary movement clearance between plunger and screw can be realized, without interrupting the flow channel for the melt, regardless of the position of the injection device.

According to still another advantageous feature of the invention, an additional intermediate component can be disposed anteriorly of the movement space of the plunger between the nozzle and a respective housing portion to provide an expanded accumulation chamber for the melt in x-direction, wherein the plunger is provided on the nozzle side with a tapered shaft which provides the expulsion of the melt. Also this embodiment has the advantage, that the "first in-first out" principle is maintained because the melt components that enter first the accumulation chamber are ultimately injected first through the nozzle into the injection mold.

It would also be conceivable in accordance with a further feature of the present invention to implement a spacer element in the form of a tapered shaft which is surrounded by a circular ring shaped flow channel defined between the shaft and the housing and having a cross section which narrows slightly conically from the screw to the plunger, and further providing an aperture ring disposed in the housing at slight distance to the plunger for reducing a cross section of the circular ring shaped flow channel, wherein the shaft has a plunger-proximal end formed with a ring-shaped constriction and is provided with at least one axial throughbore to connect a flow channel, which extends out from the screw, with the constriction of the shaft, for establishing a fluidic communication between the throughbore and the circular ring shaped flow channel. This particular feature has the advantage that no flow dead spaces are generated in the flow cross section available for the melt, even when the plunger/screw arrangement (injection device) has moved forward, so that the so-called "first in-first out" principle is maintained also here.

According to yet another feature of the present invention, there is provided an intermediate component disposed between the nozzle and the housing to extend the accumulation chamber in axial direction, wherein the plunger is provided on a nozzle-proximal side with a tapered shaft for expulsion of plastic melt from the accumulation chamber. Also in this case, the principle of "first in-first out" is ultimately maintained because the melt components, which enter first the area anteriorly of the plunger from the flow channel extending through the mixing and metering device, enter also first the injection mold during later expulsion of the melt, whereby the subsequently melted melt components follow in the respective chronological sequence.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
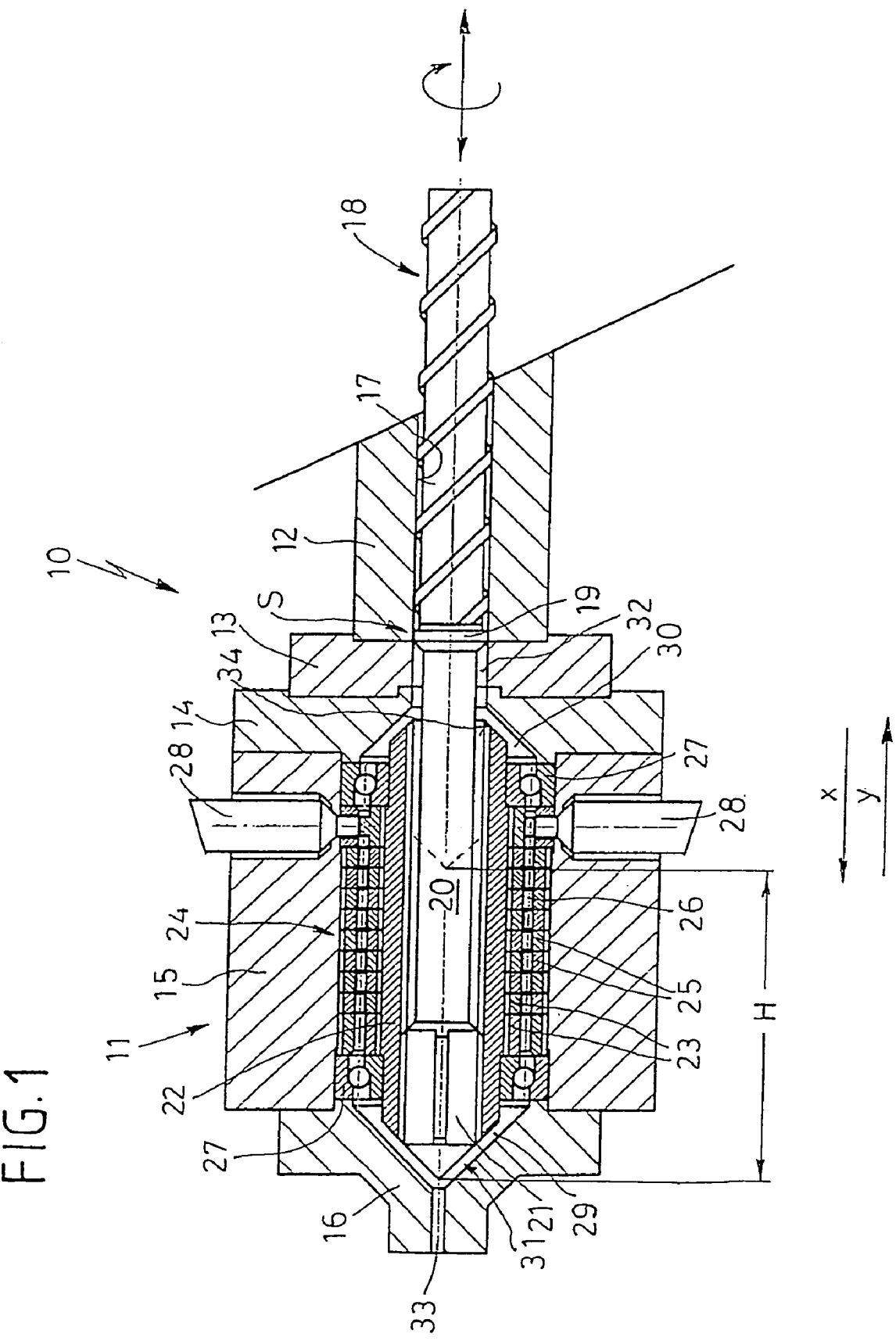
FIG. 1 a longitudinal section of a first embodiment of an injection unit according to the present invention, with the injection device in forward end position after expulsion of melt.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a longitudinal section of a first embodiment of an injection unit according to the present invention, generally designated by reference numeral 10 and forming part of an injection molding machine. The injection unit 10 includes a housing 11 which is comprised of the housing portions 12, 13, 14, 15, and 16. Disposed in the housing portions 12 and 13 is a circular cylindrical guide channel 17 in which a screw 18 of an injection device S is arranged rotatably and axially moveably. The screw 18 is provided on its free end with a thrust device in a manner not shown. Disposed on the other end of the screw 18 is a backflow prevention assembly 19 followed by a tapered shaft 20 as well as a plunger 21. The plunger 21 is arranged for longitudinal movement in a concomitantly rotating tube 22 having an outer circumferential surface for arrangement of circular ring shaped mixing elements 23 of a mixing and metering device 24. Further mixing elements 25 are secured to the housing portion 15 at a distance and in confronting relation to the mixing elements 23 such that a circumferential circular ring shaped flow channel 26 is formed. Opposing mixing elements 23 and 25 may hereby be designed with different surface configurations, e.g. different toothed surfaces. The unitary structure comprised of plunger 21, tube 22 and mixing elements 23 is firmly or form-fittingly connected with the tapered shaft 20 as well as the screw 18 and rotatably supported via ring bearings 27 within the housing 11.

The mixing and metering device 24 is further provided for introduction of additives with inlets 28 which are arranged within the housing portion 15 and have an outlet port which terminates in the flow channel 26 of the mixing and metering device 24. The flow channel 26 of the mixing and metering device 24 is connected via radial flow channel zones 29 and 30 with an accumulation chamber 31 that receives the plastic melt and is disposed anteriorly of the plunger, on the one hand, and with an annulus-forming flow channel 32 disposed in surrounding relationship to the tapered shaft 20. The housing portion 16 includes a nozzle bore 33 via which melt contained in the accumulation chamber 31 can be injected into a not shown injection mold.

FIG. 1 shows the position of the injection unit 10 and the injection device S immediately after the injection stage. It can be seen that the injection device S has been advanced by a maximum stroke H in the direction x to a position before the nozzle bore 33 (see comparison between FIGS. 1 and 3). As a consequence, plastic melt is pushed almost entirely out of the accumulation chamber 31 into the injection mold (not shown). When the screw 18 begins to rotate again, plastic material is increasingly plasticized in the screw 18 and transported via the backflow prevention assembly 19 into the annulus-forming flow channel 32 and further via the flow channel zones 30, 26 and 29 into the accumulation chamber 31 for the melt. As the mixing and metering device 24 is rotationally connected with the plunger/screw drive (drive of the injection device S), the melt is thoroughly mixed during transport of the melt while additives are supplied simultaneously, before the melt enters the accumulation chamber 31.

Figure 2:
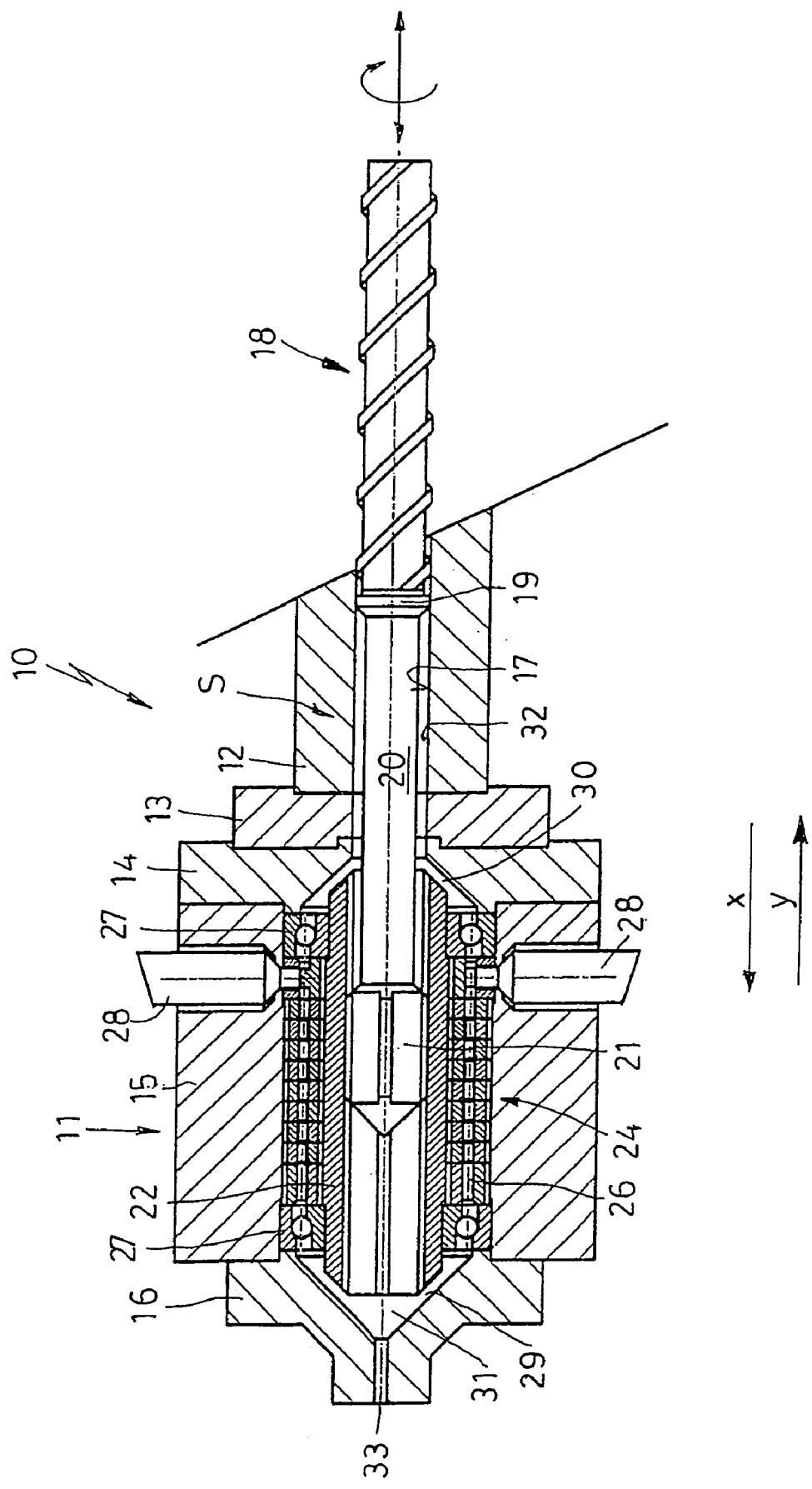
FIG. 2 a longitudinal section of the injection unit of FIG. 1 during charging melt into the accumulation chamber disposed in front of the plunger of the injection device.
Figure 3:
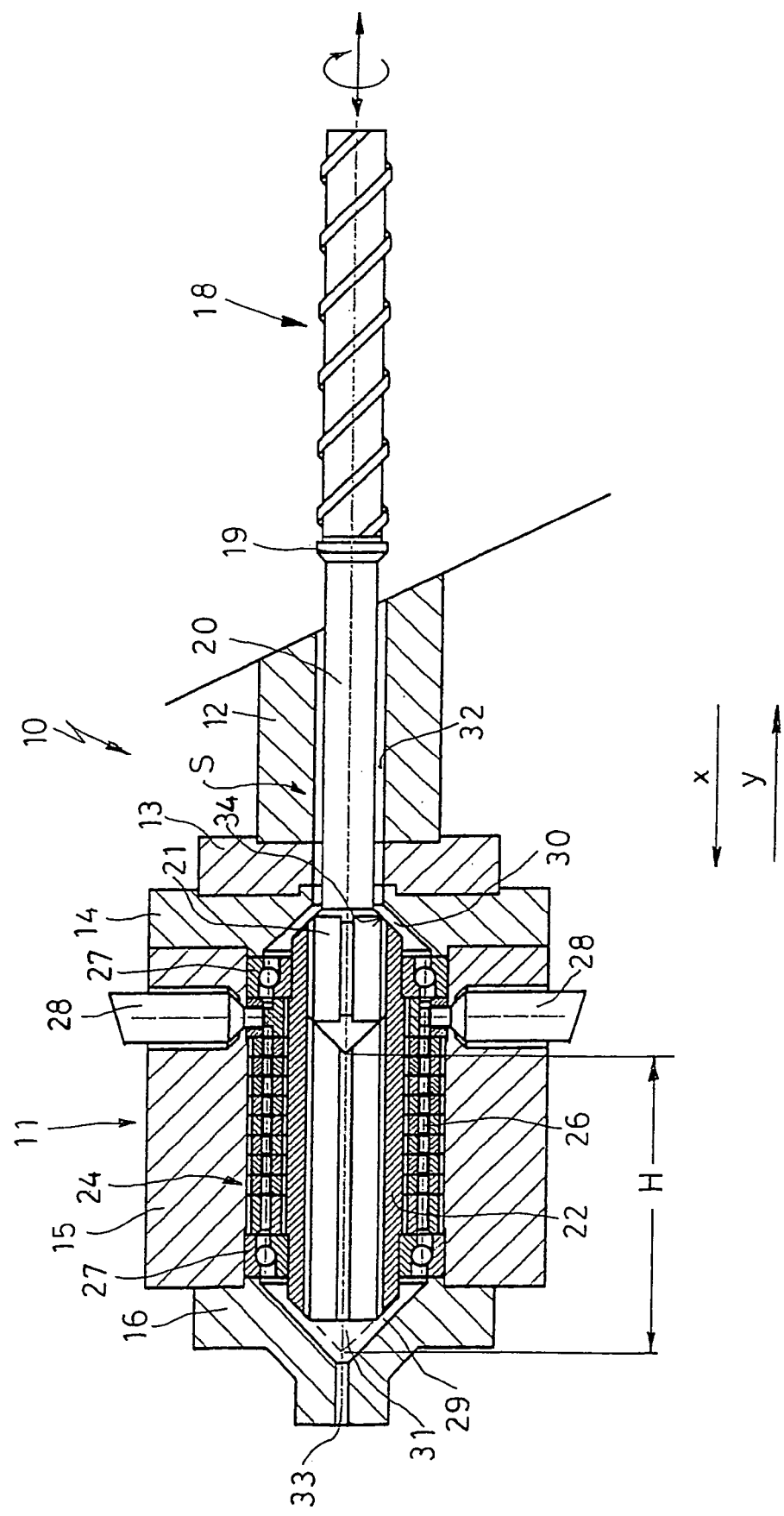
FIG. 3 a longitudinal section of the injection unit of FIG. 1, with the injection device in rearward end position and with the accumulation chamber filled with melt.

Since melt is increasingly transported into the accumulation chamber 31, the injection device S, comprised of the plunger 21 of the tapered shaft 20 as well as the screw 18, is moved backwards in y-direction at the same time. This procedure is only terminated when the accumulation chamber 31 is filled with plastic melt and the plunger 21 impacts against a shoulder 34 during its movement in y-direction (FIG. 3). This is the moment when again the not shown thrust device of the injection device S is moved in x-direction, whereby the backflow prevention assembly 19 prevents a backflow of the melt into the screw 18 during the injection process. FIG. 2 shows an intermediate disposition of the plunger 21 during charging operation of the accumulation chamber 31, when retracting in y-direction, or during the injection stage, when advancing in x-direction.

Figure 4:
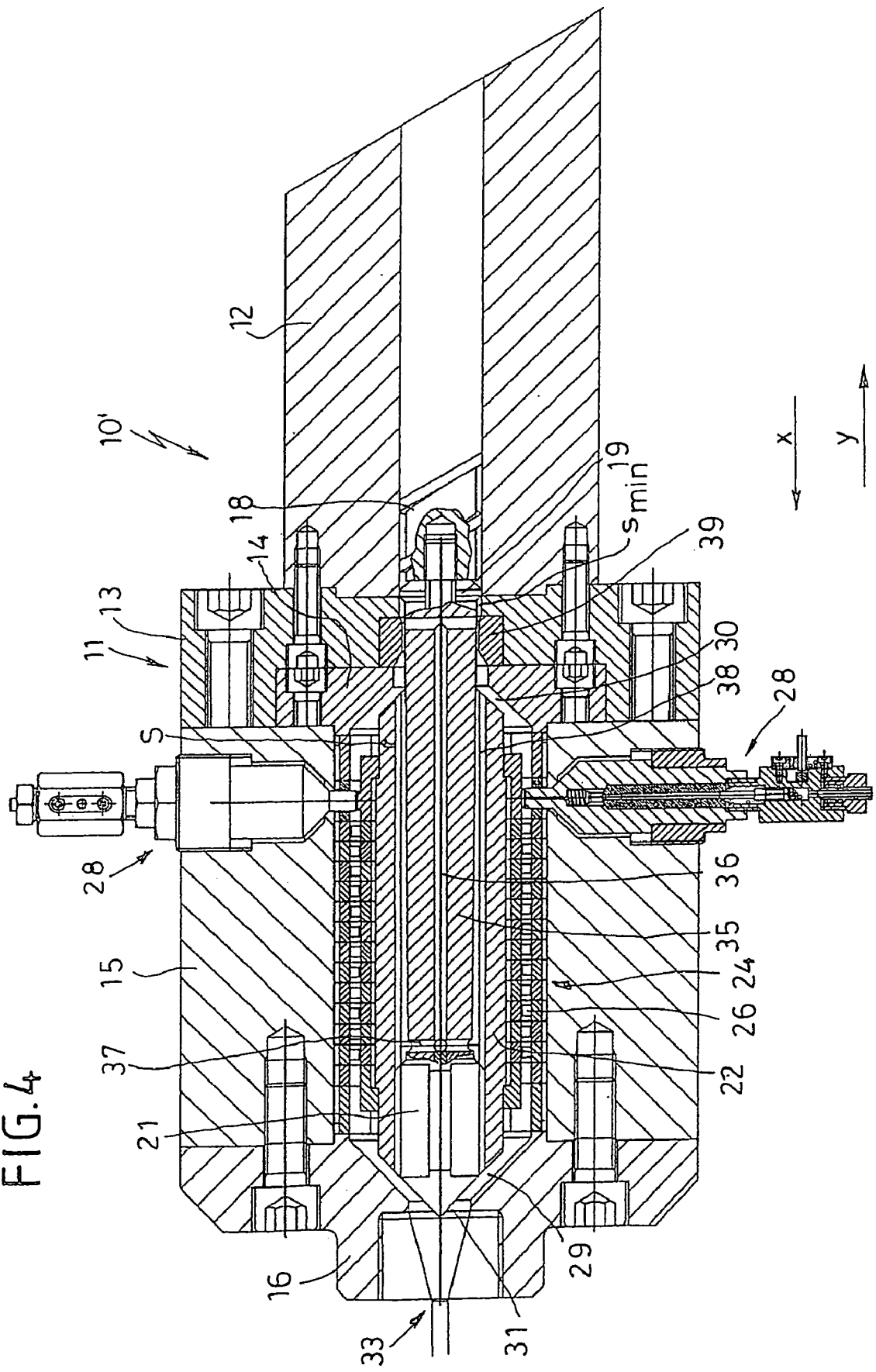
FIG. 4 a longitudinal section of a second embodiment of an injection unit according to the present invention, with the injection device in forward end position after expulsion of melt.
Figure 5:
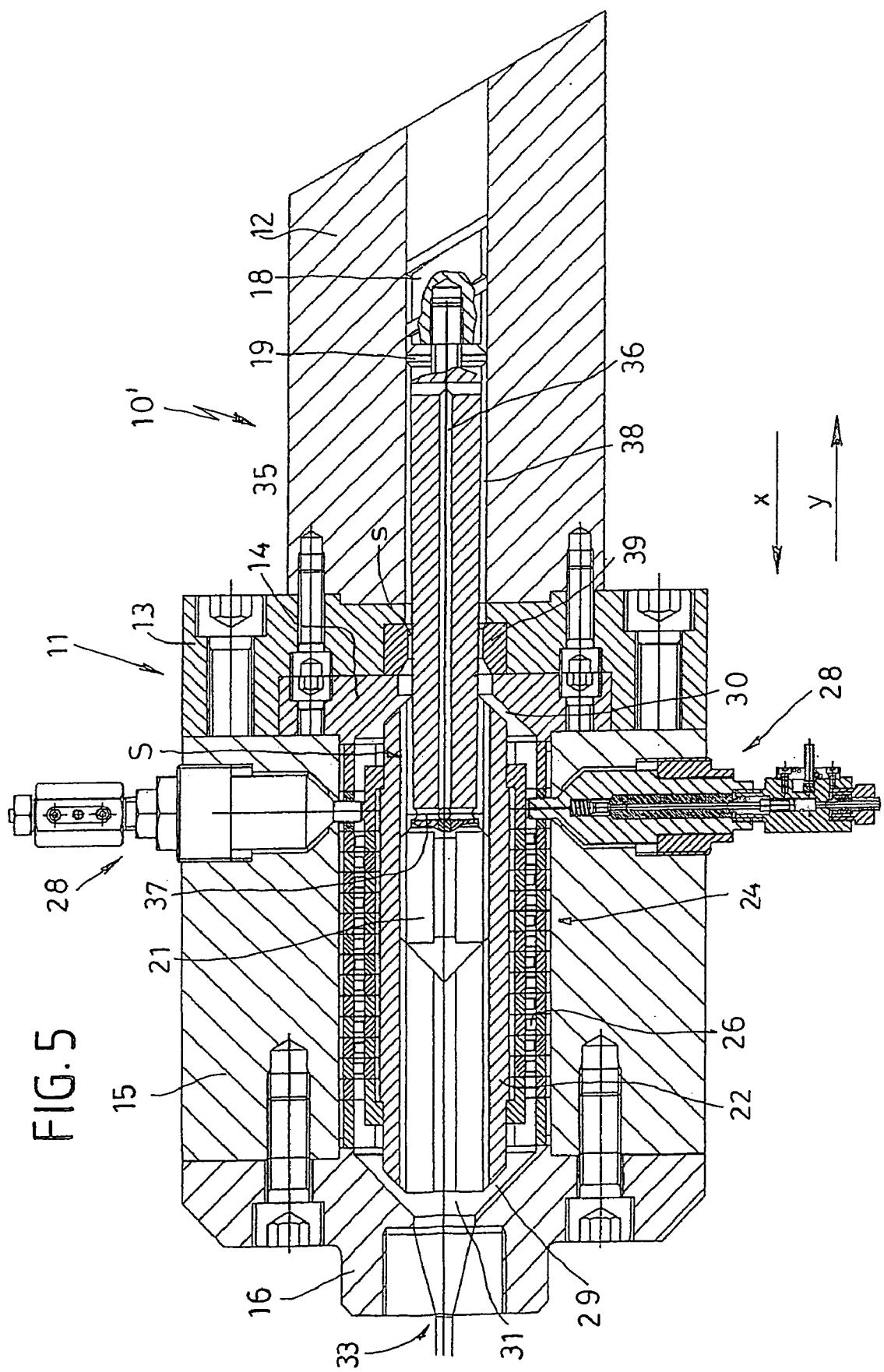
FIG. 5 a longitudinal section of the injection unit of FIG. 4 during charging melt into the accumulation chamber.
Figure 6:
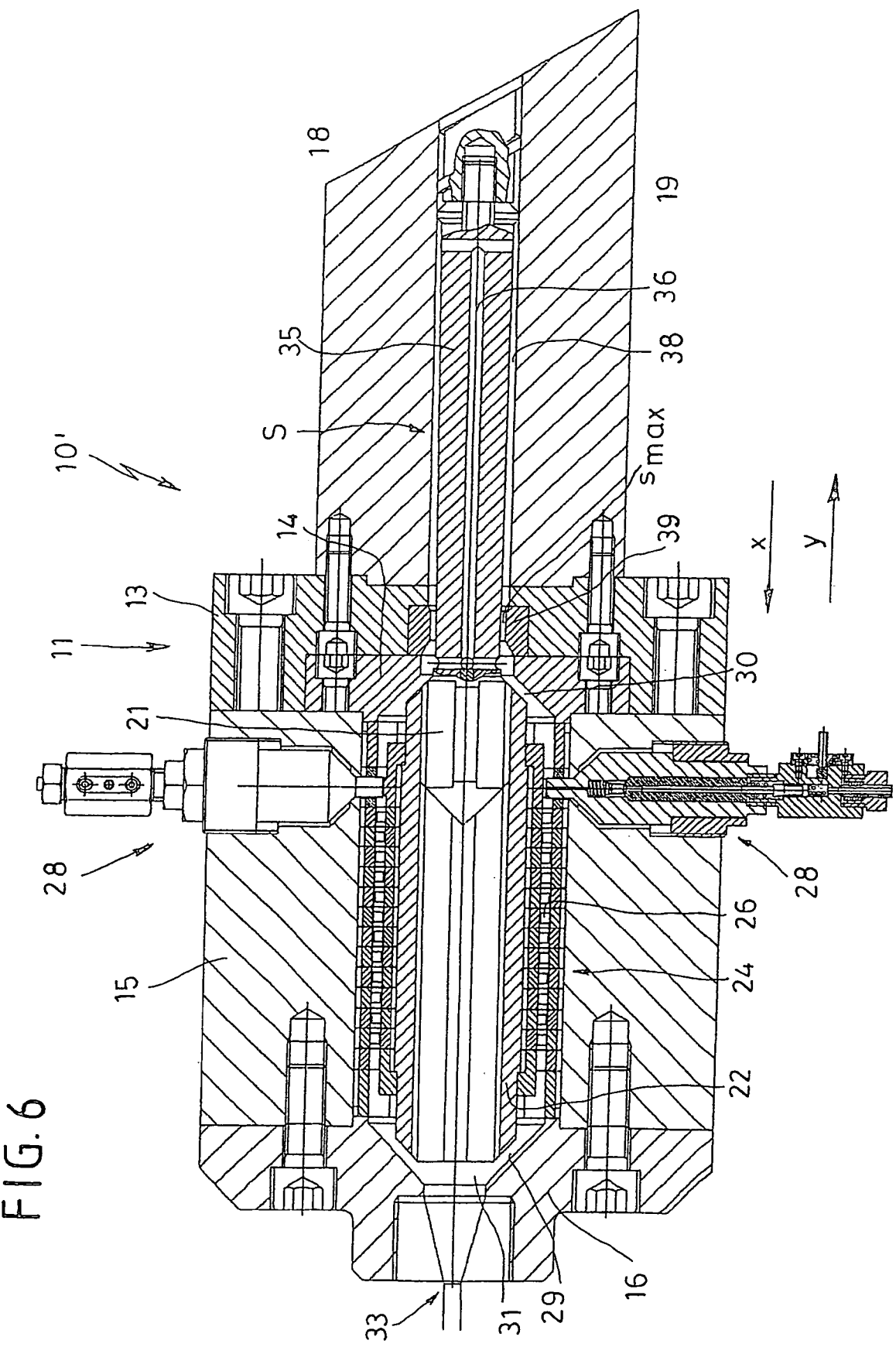
FIG. 6 a longitudinal section of the injection unit according to FIG. 4, with the injection device in rearward end position and with the accumulation chamber filled with melt.

FIGS. 4 to 6 illustrate another embodiment of an injection unit according to the present invention, generally designated by reference numeral 10'. Parts corresponding with those in FIG. 1 are denoted by identical reference numerals and not explained again. The description below will center on the differences between the embodiments. In this embodiment, provision is made for the arrangement of a spacer element 35 which is arranged between the plunger 21 and the screw 18 and is implemented in the form of a tapered shaft that converges in slightly conical manner from the backflow prevention assembly 19 to the plunger 21. The spacer element 35 has a central throughbore 36 which begins in the area of the backflow prevention assembly 19 and ends in a ring-shaped constriction 37 of the spacer element 35 at the plunger-side end of the spacer element 35 for establishing a fluidic communication between the throughbore 36 and an annulus-forming flow channel 38.

Further arranged at a slight distance to the movement zone of the plunger 21 in the housing portion 13 is an aperture ring 39 which reduces the flow cross section of the flow channel 38. Established between the aperture ring 39 and a surface of the spacer element 35 during movement of the injection device is a maximum gap $s_{max}$, when the accumulation chamber 31 is filled and the plunger 21 assumes the end position in y-direction, as shown in FIG. 6, and a minimum gap $s_{min}$, when the accumulation chamber 31 is emptied and the plunger 21 assumes the end position in x-direction, as shown in FIG. 4. FIG. 5 shows an intermediate disposition of the plunger 21 during charging operation of the accumulation chamber 31, when retracting in y-direction, or during the injection stage, when advancing in x-direction.

The injection device 10' prevents the formation of flow dead spaces in each position of the injection device S by increasing the flow resistance of the annulus-forming flow channel 38, as the injection device S progressively moves in x-direction, due to the continuous narrowing of the gap s, so that the actually longer flow path through the throughbore 36, the annular constriction 37 as well as the return path (in y-direction) through the flow chamber 38 to the flow channel 30 still has a similar flow resistance as the afore-mentioned shorter flow path. In this way, melt that exits first the backflow prevention assembly 19 also flows first through the flow channel 30 and ultimately reaches first the accumulation chamber 31 so as to be pushed first through the nozzle bore 33 into the injection mold (first in-first out principle).

Figure 7:
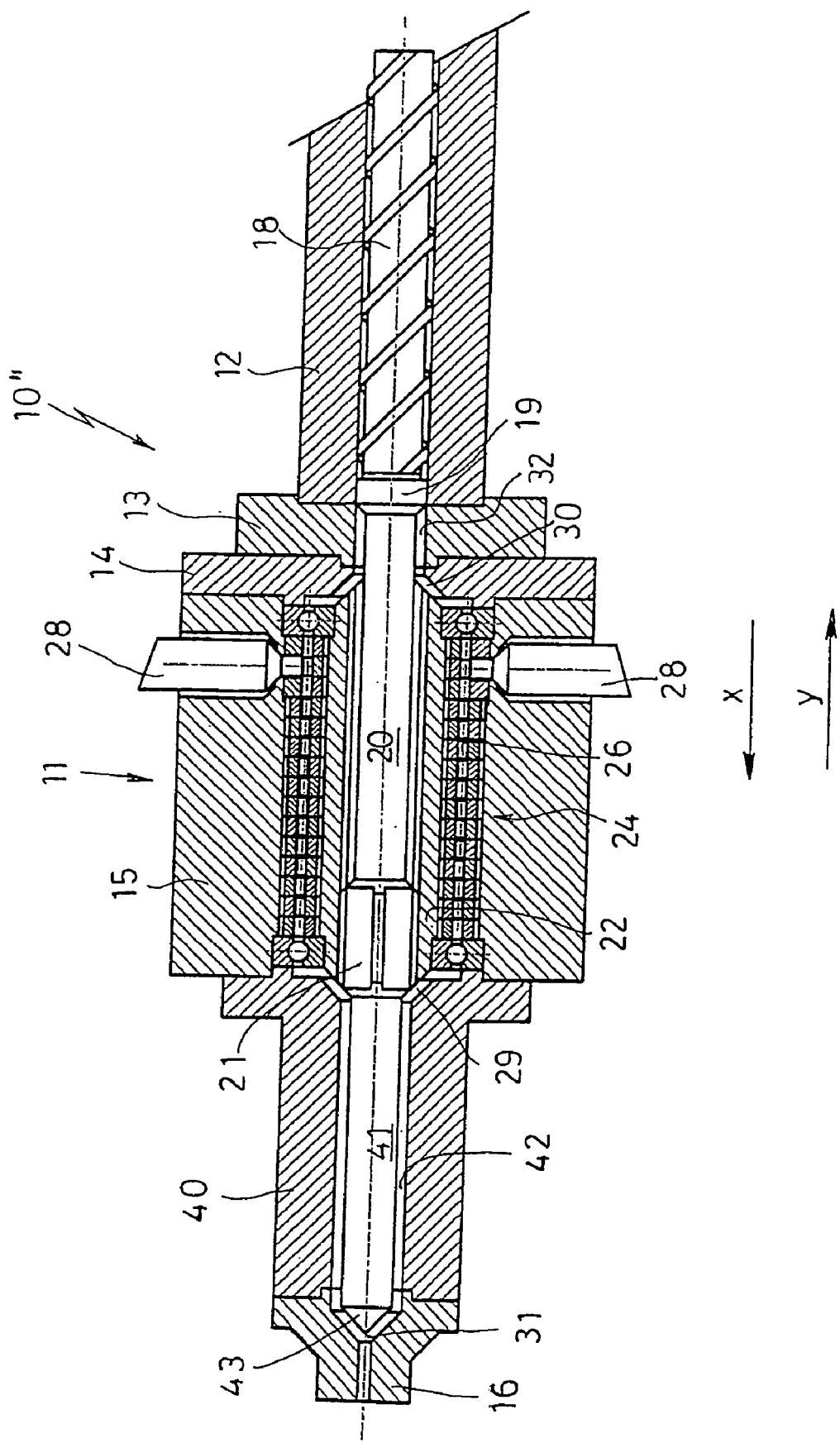
FIG. 7 a longitudinal section of a third embodiment of an injection unit according to the present invention.
Figure 8:
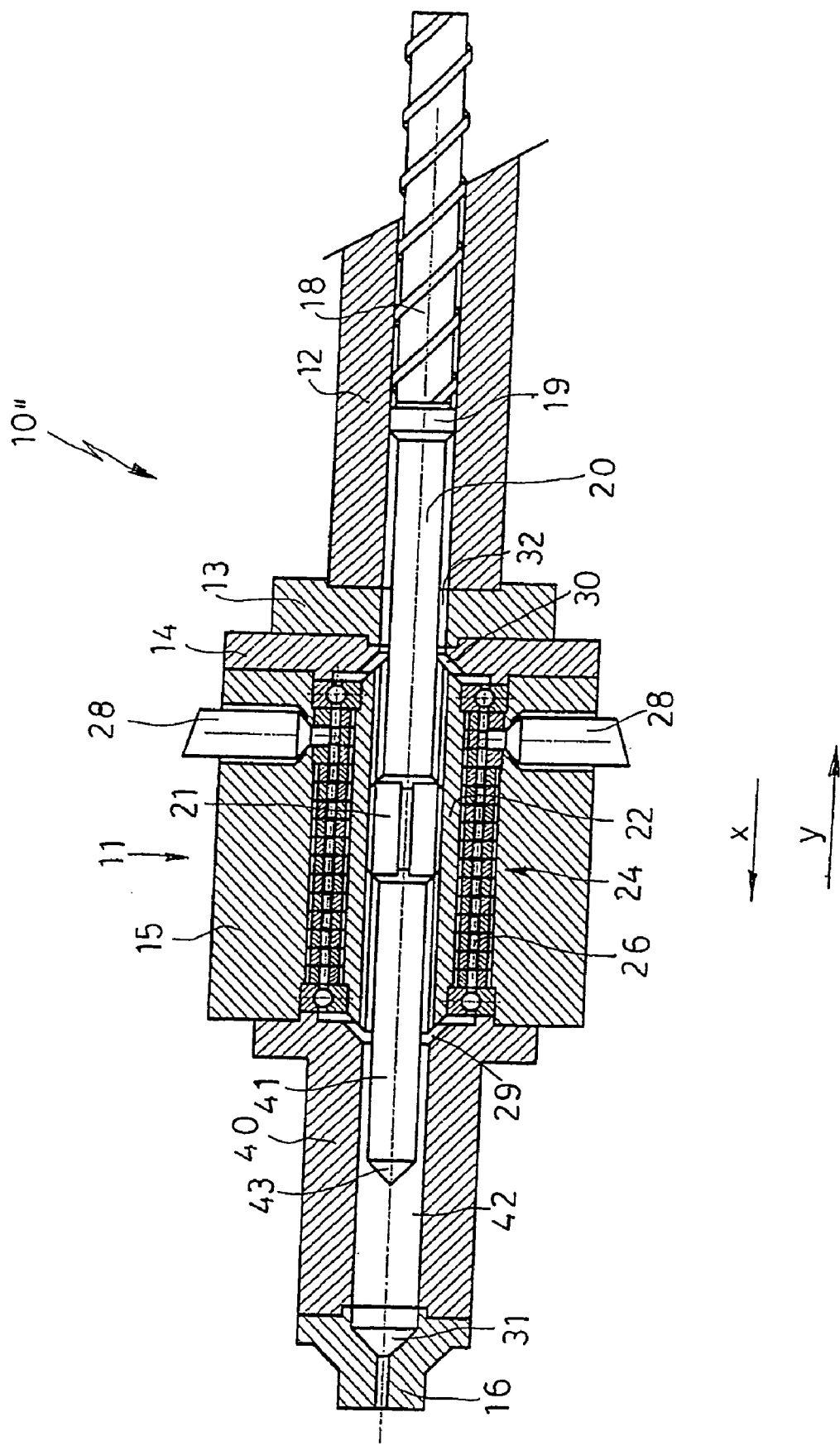
FIG. 8 a longitudinal section of the injection unit of FIG. 7 during charging melt into the accumulation chamber.
Figure 9:
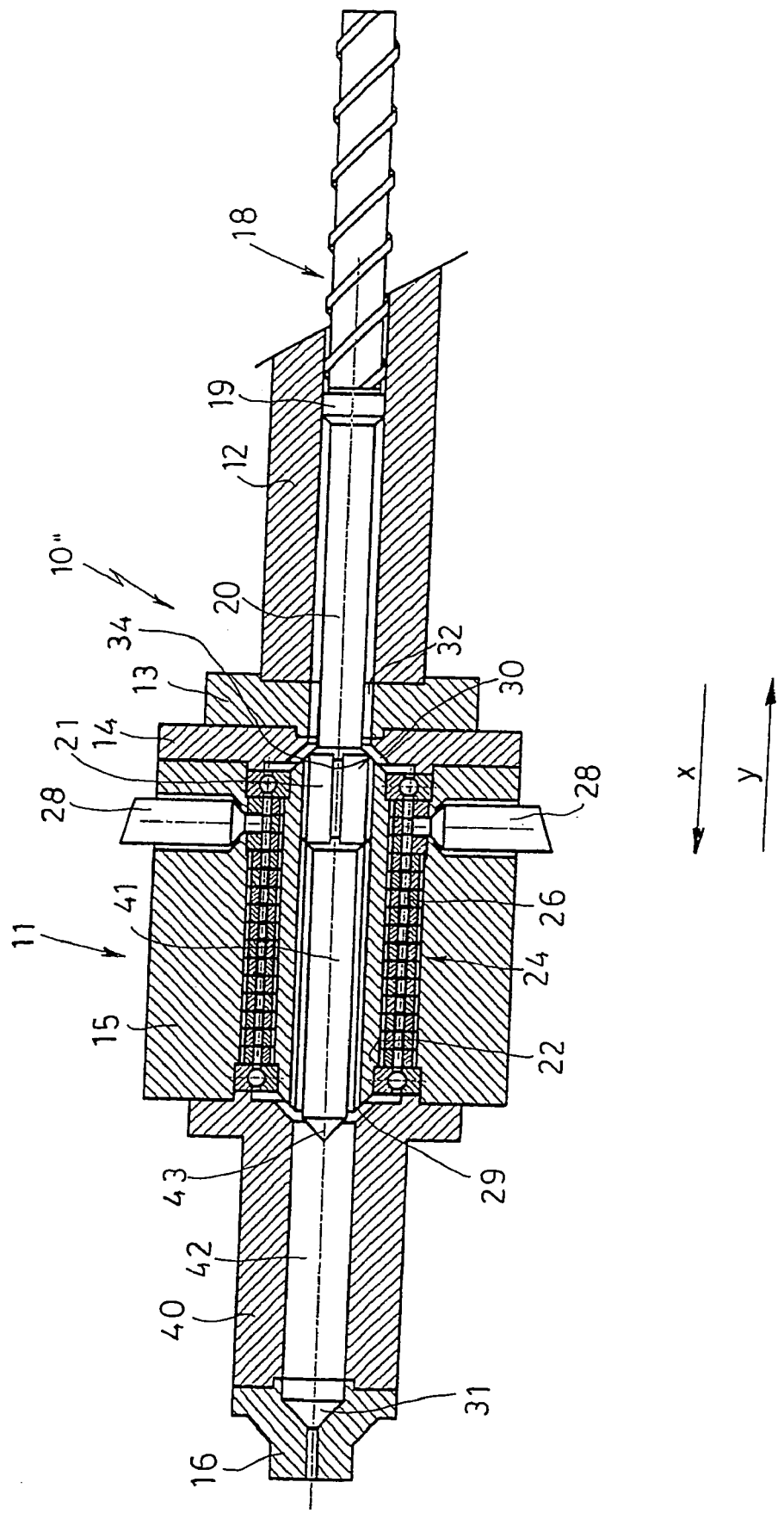
FIG. 9 a longitudinal section of the injection unit of FIG. 7 with the accumulation chamber filled with melt.

Referring now to FIGS. 7 to 9, there are illustrated a third embodiment of an injection unit according to the present invention, generally designated by reference numeral 10". Parts corresponding with those in FIG. 1 are denoted by identical reference numerals and not explained again. The description below will again center primarily on the differences between the embodiments. In this embodiment, provision is made for the arrangement of an intermediate component 40 which is arranged between the housing portion 16 and the housing portion 15, for realizing a substantial prolongation of the accumulation chamber 31 in x-direction.

Furthermore, the plunger 21 is provided with a shaft-like ejection element 41 which has a smaller diameter than the plunger 21 so that a ring space 42 is left as flow cross section for the melt. After expulsion of the melt from the accumulation chamber 31 (see FIG. 7), the injection device S is caused to move again, just like in the other embodiments, to start a rotary movement of the injection device S. At the same time, melt is transported via the various afore-mentioned flow channels 32, 30, 26 and 29 to the ring space 42 and then into the accumulation chamber 31 between nozzle bore 33 and a free end 43 of the shaft 41. At the same time, the entire injection device S is moved continuously backwards in y-direction, as a consequence of the increased accumulation of melt in the accumulation chamber 31, until the end position in y-direction, shown in FIG. 9, has been reached. The afore-mentioned "first in-first out" principle is maintained in an advantageous manner also by the injection unit 10".

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An injection unit of an injection molding machine, comprising:
   a housing having an inner diameter;
   an injection device received in the housing for carrying out axial and rotating movements and including a screw constructed for plasticizing plastic granulate during transport thereof into plastic melt and including a backflow prevention assembly, a plunger for pressing the plastic melt from an accumulation chamber through a nozzle into an injection mold, and a spacer element arranged between the backflow prevention assembly of the screw and the plunger and having a length corresponding at least to a stroke of the injection device, with the spacer element having a first flow channel for establishing in each position of the injection device a fluidic communication with a second flow channel which initially extends radially outwards and then parallel to a movement and guide area of the plunger to an area between the nozzle and the plunger; and
   a mixing and metering device embracing the plunger at least partially in a circular ring shaped manner for mixing and metering plastic melt and including an inlet for introduction of an additive, wherein the second flow channel extends through the mixing and metering device adjacent to the movement and guide area of the plunger, said mixing and metering device being in driving relationship with the injection device and including a rotatable tube in fixed rotative connection with the plunger, and a plurality of mixing elements arranged on the tube and on the inner diameter of the housing.

2. The injection unit of claim 1, wherein a first plurality of the mixing element is secured to the rotatable tube and a second plurality of mixing elements is secured to the inner diameter of the housing, said first and second pluralities of mixing elements having different surface configurations in opposite relationship.

3. The injection unit of claim 2, wherein the surface configurations include toothed surfaces.

4. The injection unit of claim 1, wherein the spacer element includes a continuously tapered shaft which is surrounded by a circular ring shaped flow channel defined between the shaft and the housing and fully available for transport of plastic melt from the screw to the mixing and metering device.

5. The Injection unit of claim 1, wherein the spacer element includes a tapered shaft which is surrounded by a circular ring shaped flow channel defined between the shaft and the housing and having a cross section which narrows slightly conically from the screw to the plunger, and further comprising an aperture ring disposed in the housing at slight distance to the plunger for reducing a cross section of the circular ring shaped flow channel, wherein the shaft has a plunger-proximal end formed with a ring-shaped constriction and is provided with at least one axial throughbore to connect a flow channel, which extends out from the screw, with the constriction of the shaft, for establishing a fluidic communication between the throughbore and the circular ring shaped flow channel.

6. The injection unit of claim 1, and further comprising an intermediate component disposed between the nozzle and the housing to extend the accumulation chamber in axial direction, wherein the plunger is provided on a nozzle-proximal side with a tapered shaft for expulsion of plastic melt from the accumulation chamber.

* * * * *